United States Patent [19]
McGraw

[11] 4,166,445
[45] Sep. 4, 1979

[54] LOW COST SOLAR COLLECTOR

[76] Inventor: Thomas F. McGraw, 7538 Axton St., Springfield, Va. 22151

[21] Appl. No.: 866,188

[22] Filed: Dec. 30, 1977

[51] Int. Cl.² .................................................. F24J 3/02
[52] U.S. Cl. ..................................... 126/432; 126/449
[58] Field of Search ............... 126/270, 271; 237/1 A; 165/104, 107

[56] References Cited
U.S. PATENT DOCUMENTS

| | | | |
|---|---|---|---|
| 3,908,632 | 9/1975 | Poulsen | 126/271 |
| 3,939,818 | 2/1976 | Hamilton et al. | 126/271 |
| 3,981,294 | 9/1976 | Deminet et al. | 126/271 |
| 4,067,316 | 1/1978 | Brin et al. | 126/271 |
| 4,082,082 | 4/1978 | Harvey | 126/271 |
| 4,112,921 | 9/1978 | MacCracken | 126/271 |

*Primary Examiner*—James C. Yeung
*Attorney, Agent, or Firm*—Joseph E. Rusz; Jacob N. Erlich

[57] ABSTRACT

A solar collector having a frame-like wooden housing which contains therein heat absorbing material in the form of pellets of coal or "diced" automobile tires. This material is sealed within the housing by a transparent cover. The resultant sealed container allows a flow of working fluid to pass therethrough by way of a pair of perforated pipes. The collector is oriented to receive maximum solar radiation in order to heat the heat absorbing material. The working fluid which flows in contact with the heat absorbing material, absorbs heat therefrom, and, by means of a circulating system which is not part of the invention is generally carried to a storage tank or the like for use at a later time.

10 Claims, 4 Drawing Figures

LOW COST SOLAR COLLECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to solar collection systems, and, more particularly, to a low cost solar collector which incorporates therein renewable and readily available components in the construction thereof.

Solar collectors are generally constructed in a variety of designs and rely upon the absorption of the sun's energy to heat a medium located within the collector. This heated medium is utilized in conjunction with the remaining elements of a conventional solar collection or heating system to, for example, provide a heat source which does not rely upon, for its operation, a source of energy which is rapidly becoming exhausted such as oil or gas.

It is the primary function of a solar collector to absorb as much radiation as possible while, at the same time, losing as little heat as possible through the collector itself. Unfortunately, in an attempt to meet the above requirements and collect that last calorie of heat per unit area, collectors presently in use are based on expensive fabrication processes and utilize components therein which require large consumption of fossil fuels in their production.

For example, aluminum extrusions appear to have been designed and produced specifically to provide framing for the collectors; sophisticated welding and bonding techniques are used to assemble the units; and the assembly thereof is laid out and organized with mathematical precision. As a result thereof complete disregard has been given to the basic reasons for the development of solar collectors, that is, the conservation of our natural resources. Aluminum itself is produced by an energy-intensive process; extrusions require heavy machinery and dedicated dies; welding is energy-consumptive; and the use of skilled labor in an application where it is not needed can also be considered wasteful. These considerations are not essential for recovery of useful levels of thermal energy from the Sun, and dedication of closely resources to their production is counter-productive to the driving objective of energy conservation.

As clearly stated hereinabove, solar collectors now in production not only rely mainly upon high energy consumption manufactured products but also as a consequence thereof are extremely expensive. It is therefore clearly obvious for the seemingly slow adoption of solar heat systems or solar augmentation systems by individual homeowners.

SUMMARY OF THE INVENTION

The instant invention overcomes the problems set forth hereinabove by providing a solar collector which is extremely economical to produce. This is accomplished by a novel arrangement which utilizes renewable-resource components in the construction thereof.

The solar collector of the instant invention improves the solar collection techniques heretofore in existence by the application of lower cost design which employs therein renewable-resource materials, recycled materials, and minimal construction skills. Specifically, the solar collector of this invention is fabricated of a wooden frame forming a container which houses therein a readily available renewable-resource material such as dark colored substances in the form of pelletized coal or "diced" used automobile tires.

This heat absorbing material is covered or sealed with a transparent cover, and the resultant sealed container is flooded with water or other working fluid. The working fluid enters and exits the framed container through a pair of perforated inlet and outlet pipes, respectively.

The solar collector is oriented to receive maximum solar radiation, and absorb a significant amount of heat. The working fluid such as water directly "wets" the fill material through maximal surface interface, and the absorbed heat is transferred to the fluid. A circulating system, which is not a part of this invention, carries the warmed water leaving the exit pipe from the highest level of the collector, and deposits it in a large storage tank. The warm water is withdrawn from the tank to warm rooms through the use of radiators or the like. The collector would normally be drained and isolated at night to prevent heat loss from its surface, although this effect could be used in hot weather to extract heat from the room and radiate it to the cooler night air.

This invention is intended to stimulate a more rapid adoption of solar heating techniques by the general public. Many of the current approaches to solar heating collectors are based on expensive fabrication processes, and most seem to strive after the ambitious goal of extracting the last calorie from solar radiation. This particular invention adopts tolerant, non-precision fabrication, and is intended to operate satisfactorily even if some of the energy is reradiated, or otherwise lost.

Current collection concepts, with their sophisticated materials and fabrication techniques result in high initial cost to the consumer—a factor no doubt significant in the seemingly slow movement to adopt "free" solar heating or cooling. This invention is designed to provide an alternative to the high initial costs, and therefore, to stimulate a new group of converts to adopt the collection of solar energy.

It is therefore an object of this invention to provide a solar collector which utilizes renewable-resource components in the construction thereof.

It is another object of this invention to provide a solar collector which substantially reduces the construction cost of collectors without substantially reducing its overall efficiency.

It is still another object of this invention to provide a solar collector which is readily adaptable for use with already existing solar collection systems.

It is a further object of this invention to provide a solar collector which is economical to produce and which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DETAILED DESCRIPTION OF THE DRAWING

DETAILED DESCRIPTION OF THE PREFERRED EMBODIMENT

Figure 1:
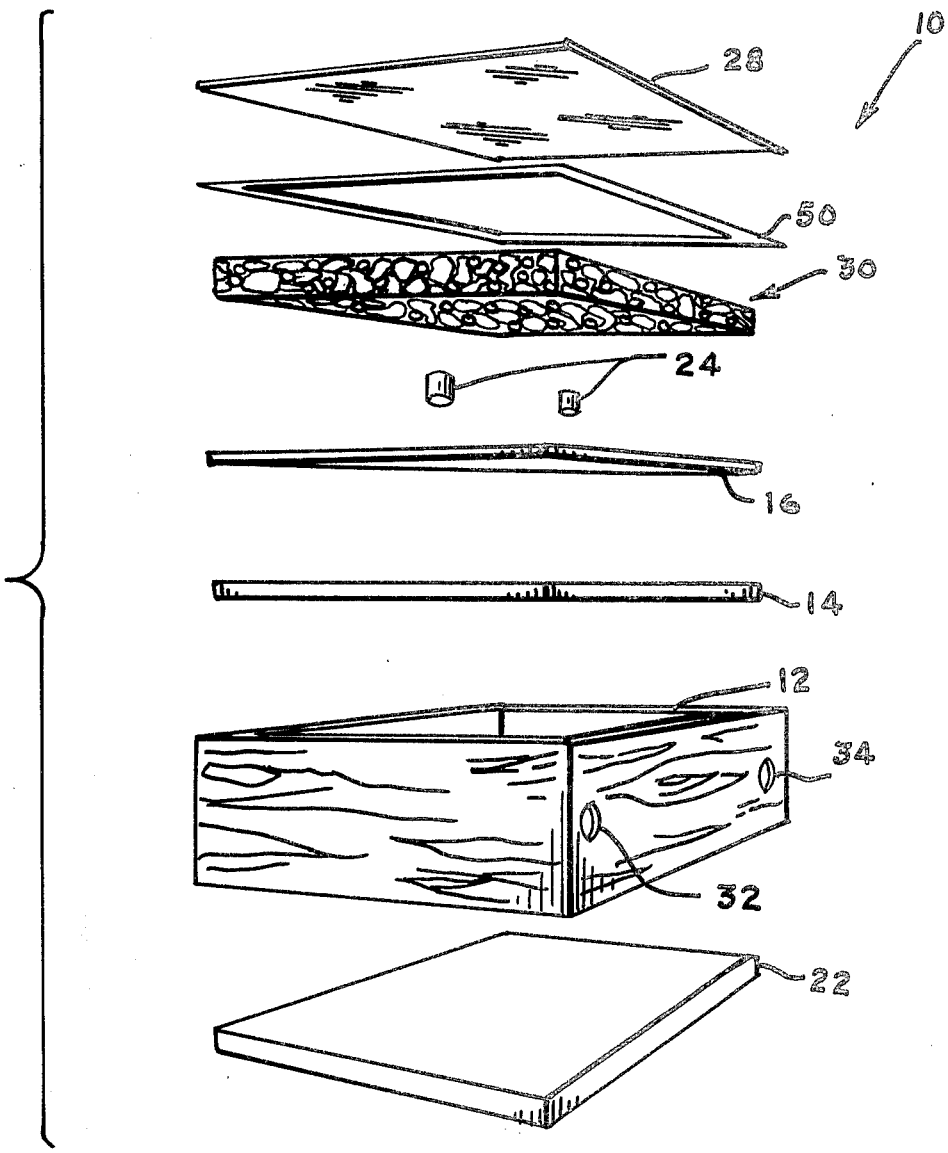
FIG. 1 is an exploded pictorial representation of the solar collector of this invention.
Figure 2:
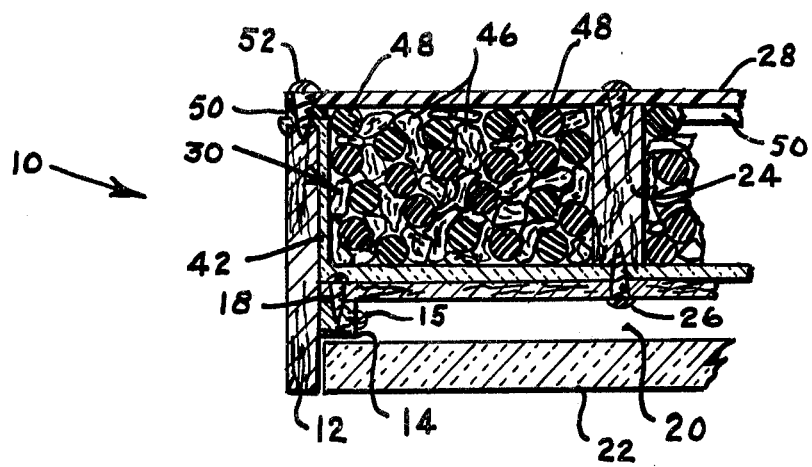
FIG. 2 is a partial side elevational view of the solar collector of this invention shown partly in cross-section.
Figure 3:
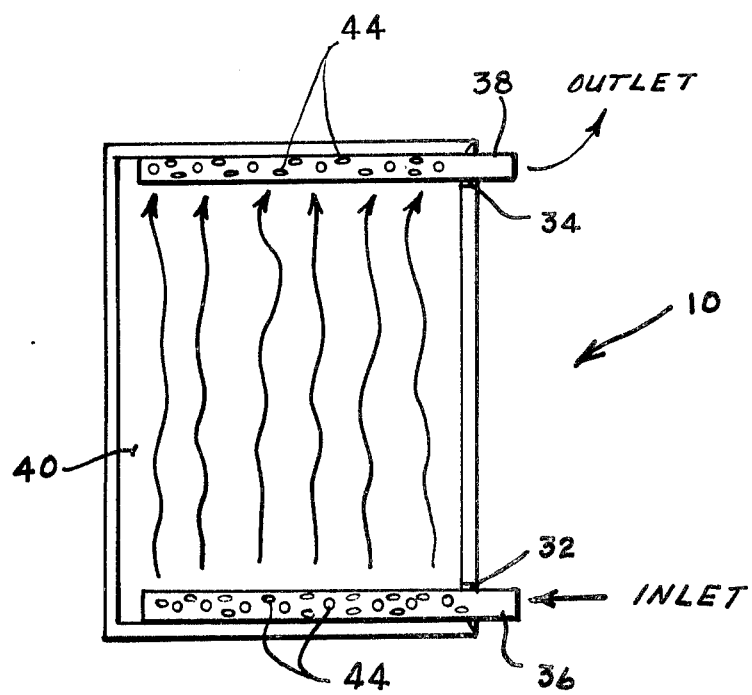
FIG. 3 is a partial plan view of the solar collector of this invention illustrating the flow of the working fluid.

Reference is now made to FIGS. 1-3 of the drawing, and, particularly FIG. 1 for a clear illustration of the solar collector 10 of this invention. Solar collector 10 is made up of a container or housing in the form of, preferably, a wooden frame 12 for housing a substance therein capable of readily absorbing the sun's radiation. Although the dimensions of frame 12 are not critical, optimum heat retention per cost are obtained with frame 12 being built by 1×4 inch lumber, with lengths selected to best utilize standard sheet sizes of plywood and plexiglass in a manner to be more fully described hereinbelow.

A base or supporting shelf 14, preferably of 1 inch by 1 inch size, is situated inside of the periphery of frame 12. For reaons set forth hereinbelow, shelf 14 is located approximately ¼ the distance above the bottom of frame 12 and secured thereto by any suitable adhesive or screw fasteners 15. A floor 16, preferably constructed of plywood ⅜ inch thick, is supported upon frame 12 and secured thereto by any suitable securing means such as adhesive or screws 18. In addition, a 1 inch by 1 inch rib (not shown) may also be necessary across the bottom of floor 16 to provide additional structural support.

The space 20 under floor 16 provides an insulating airspace, but for improved efficiency of operation contains therein an insulator 22 in the form of, for example, a sheet of insulating polyurethane. As a result thereof, insulator 22 retards the transfer of heat from the backside of collector 10 to the roof or other supporting structure upon which the solar collector 10 of the instant invention is mounted.

As clearly described hereinabove the main structural elements of this invention are made of wood. The selection of wood is based on the fact that the insulating qualities of wood, contrary to those of such space age materials as aluminum extrusions substantially reduce channels which can carry off heat and thereby waste it.

Still referring to FIGS. 1-3, located upon floor 16 are a plurality (preferably two) of supports in the form of wooden dowels 24. Supports 24 are secured at one end thereof by any suitable fastening element such as screws 26 to floor 16 and at the other end thereof act as a support for a transparent cover 28 more fully described hereinbelow. Encompassing dowels 24 and substantially filling container or frame 12 is a heat absorbing material 30. Material 30, which in combination with the other elements of collector 10, forms an essential aspect of this invention and will therefore be more fully described hereinafter.

Situated at opposite ends of frame 12 and on one side thereof are a pair of openings 32 and 34. Opening 32 at the bottom of frame 12 receives an inlet pipe 36 while opening 34 at the top of frame 12 receives an outlet pipe 38. Pipes 36 and 38 are utilized to carry a working fluid 40 such as water into and out of solar collector 10 in a manner described in detail below.

Pipes 36 and 38 are installed within frame 12 before heat absorbing material 30 is in place. Thereafter, all interior and upper surfaces of collector 10 are given a heavy coating 42 of any suitable sealant such as a polyester resin which has been selected over epoxy because of its lower cost. Coating 42 protects the wood utilized in the construction of solar collector 10 of this invention from the working fluid 40. The use of coating 42 provides a continuous single leak-free surface to the "bowl" of collector 10. In addition to the surface of collector 10, coating 42 also secures inlet and outlet pipes 36 and 38 in place.

After securing pipes 36 and 38 within openings 32 and 34, respectively, of frame 12, perforations 44 are drilled within the pipes. The number of holes or openings 44 is not particularly critical, beyond providing a total cross-section not less than the cross-sectional area of the pipe itself. In this way, pipes 36 and 38 and the resultant labyrinth will not provide any significant resistance to the flow of the working fluid 40.

The next step in the construction of solar collector 10 of this invention is the introduction therein of absorbing material 30. The interior of "bowl" formed by frame 12 is substantially filled, level to the top surface of frame 12, with heat absorbing material 30 in the form of pelletized coal 46, diced automobile tires 48, or other black, irregular pieces of material, or the combination thereof. For proper operation of this invention, heat absorbing material 30 must be thoroughly washed before the filling of collector 10 in order to minimize the amount of clogging of the system by small particles. In addition, each particle must be larger in size than the size of openings 44 within pipes 36 and 38.

Heat absorbing material 30, being preferably marble-sized coal pellets 46 or "diced" automobile tires 48, are black and provide a maximum of surface contact with working fluid 40. Coal, as a plentiful natural resource might be a reasonable choice in geographical areas where it is conveniently available naturally, or from commercial sources. A washed stoker grade would be a likely choice, and if working fluid 40 should somehow bleach the coal and reduce its collection efficiency, the coal itself could be burned for its heat, and solar collector 10 replenished by clean black coal. The "diced" auto tire approach also has secondary benefits. Tires have long been a significant waste disposal problem. While many have been applied to useful ends as fish-spawning shelters or wave-erosion resistance devices, there are so many still blighting the countryside, that they remain a problem. Many are simply burned off scrap automobiles, wasting them as a resource, and polluting the atmosphere as well. The invention described herein would provide yet another use for the tires (non-steel belted) since the soft parts can easily be chopped into irregularly-shaped, marble-sized pellets 48 to serve the same objective as previously-mentioned coal pellets 46.

A thick rubber gasket 50 around the top edge of frame 12 and a transparent cover 28 of, for example, plexiglas, lexan, or the like is used to cover frame 12 and complete solar collector 10. All closures are secured by suitable fasteners such as wood screws 52, and brass would be the best choice in the interest of reducing corrosion. Plastic cover 28 is preferred over glass since plastic is a good insulator, while still being reasonably efficient at passing the heat of solar energy. In some climates, use of plastic cover 28 may permit elimination of a second sheet of glass, which could be added to minimize reradiation.

This invention is intended to perform the same basic function as currently available commercial collectors, that is, to capture heat in some thermal mass, and to transfer that heat to a working fluid. The working fluid then carries the collected energy to some storage volume from which it can be withdrawn to meet space heating requirements. The instant invention addresses itself only to collector 10. In collector 10 the working fluid 40 is at ambient temperature and is introduced through inlet pipe 32 mounted across the bottom of frame 12. Within frame 12, pipe 32 is heavily perforated at 44 to permit unrestricted flow of water 40 (working fluid). The actual flow rate is controlled elsewhere in the circuit (not shown).

Water 40, having escaped perforated pipe 44, fills the voids between the heat absorbing material 30. Outlet pipe 38 is identical to inlet pipe 36, except that it is located across the top of frame 12. Water 40 (or even air as a working fluid) immerses heat absorbing material 30 and effects a maximum surface contact to encourage heat transfer. Once the level of water 40 initially reaches the top of collector 10 and begins to flow out pipe 38, it naturally remains full as long as input is maintained. Only the warmest water in collector 10 is likely to leave outlet pipe 38 since it has had to traverse the entire labyrinth (see FIG. 3) to reach outlet pipe 38, and has thus been exposed maximally to direct solar radiation and to the warm surfaces of heat absorbing material 30.

Figure 4:
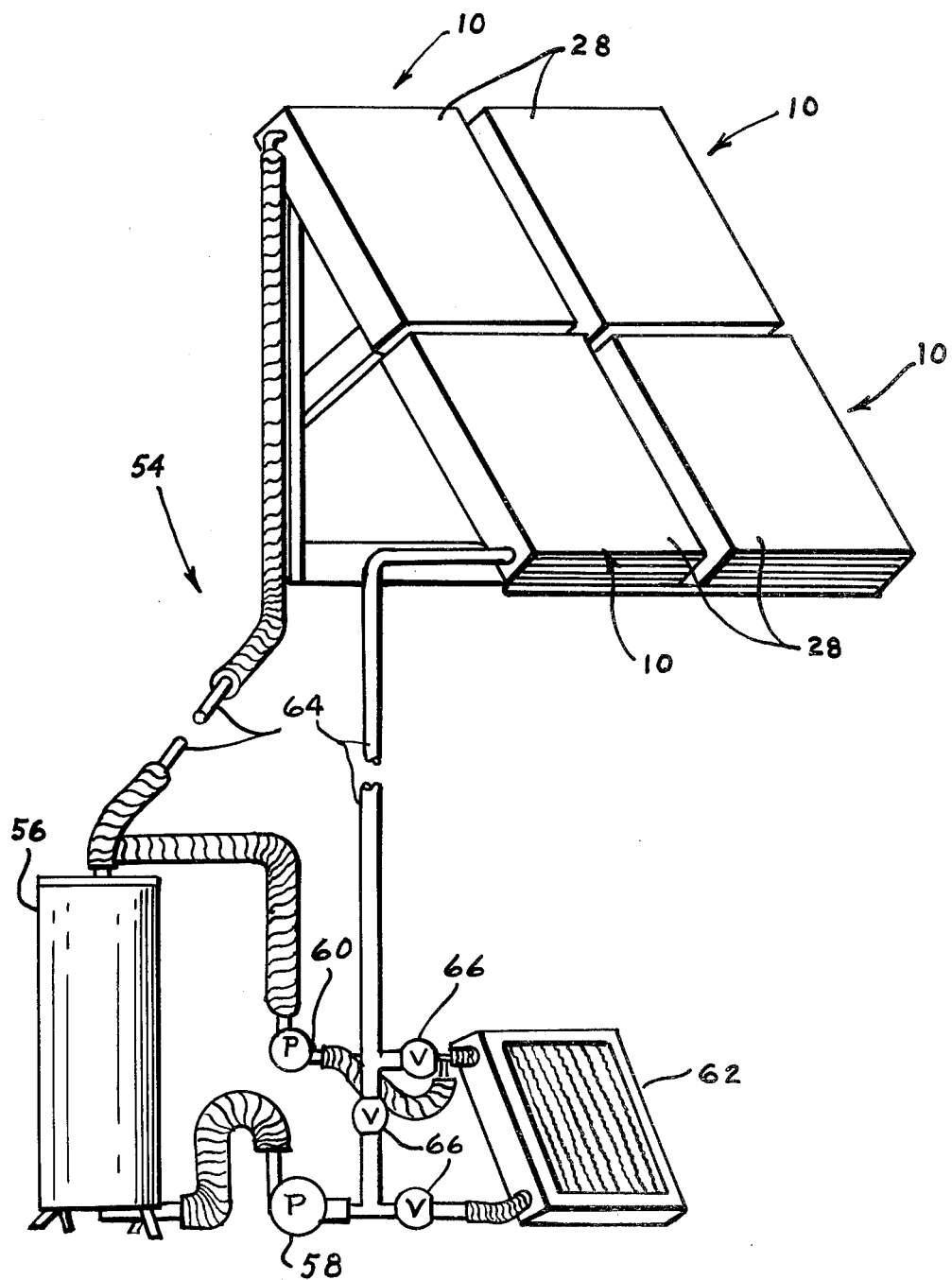
FIG. 4 is a pictorial illustration of a plurality of solar collectors of this invention shown with a solar collection system.

Upon completion of solar collector 10 of this invention, it is ready to integrate with the remainder of a conventional solar collection system 54 as best illustrated in FIG. 4 of the drawing. While the remainder is not a part of the instant invention, a typical collection system 54 might include the following: collector 10; a large insulated tank 56 (as a discarded water heater) to store the heated water; a circulating pump 58 to cycle water through the whole system; a smaller pump 60 to circulate the water only between tank 56 and a radiator 62 at night when collector 10 is isolated to prevent heat loss; a radiator 62 to transfer the heat of the water to the room air; piping 64; valves 66; and perhaps thermostatical controls (not shown) to regulate both pumps 58 and 60 and valves 66 (an expensive option of this sort may not be compatible with the basic objective of economy here).

Solar collector 10 is mounted outside the home, with its transparent surface or cover 28 oriented to be normal to the plane of the apparent path of the Sun, as corrected for latitude and season. Collector 10 is connected to the rest of system 54 by insulated pipe 64. Storage tank 56 and controls would normally be located in a utility room, where any leaking heat might still contribute to the temperature of the dwelling.

This invention is not intended to be a glossy space-age device. It is in fact intended to be just the opposite. Specifically, it embodies an appeal for a return to basics in terms of solar thermal energy collection, and is an attempt to discourage attempts to extract marginal returns from solar collectors. The overall objective is to encourage adoption of solar heating techniques through reduction of the typically high initial cost to the homeowner. The instant invention provides a solar collector 10 which alleviates attempts to collect that last calorie per unit area which are often actually energy-wasteful and therefore counter-productive to the goal of independence from non-renewable resources. That is, the use of sophisticated materials and processing to achieve "high" efficiency usually involves procedures which require heavy consumption of fossil fuels in their production.

Although this invention has been described with reference to a particular embodiment, it will be understood to those skilled in the art that this invention is also capable of further and other embodiments within the spirit and scope of the appended claims.

I claim:

1. A solar collector comprising a housing in the form of a frame-like structure having a plurality of sides and a base, a first and second opening located in said housing, said first opening located at one end of said housing and said second opening located at the other end of said housing, a first conduit extending into said housing through said first opening in a predetermined longitudinal direction, a second conduit extending into said housing through said second opening in a direction parallel to said predetermined longitudinal direction of said first conduit, each of said conduits being perforated, said perforations being of a predetermined size and located in that portion of said conduits located within said housing, a heat absorbing material positioned upon said base, encompassing said first and second conduits and substantially filling said housing, said heat absorbing material being in the form of pellets of marble-size, renewable-resource-material, said size of said heat absorbing material being greater than said predetermined size of said perforations, a transparent cover sealing said heat absorbing material within said housing whereby a working fluid entering said first perforated conduit flows from said first conduit through said perforations therein, passes through said heat absorbing material and enters said second conduit through the perforations therein upon the positioning of said solar collector substantially in optical alignment with a source of solar energy, the temperature of said working fluid exiting said second conduit being higher than the temperature of said working fluid entering said first conduit.

2. A solar collector as defined in claim 1 further comprising means located within said housing for sealing the interior surface of said housing and the area adjacent said first and second opening and said first and second conduit, respectively, said sealing means being substantially unaffected by changes in temperature.

3. A solar collector as defined in claim 2 wherein said heat absorbing material is in the form of pellets of coal.

4. A solar collector as defined in claim 2 wherein said heat absorbing material is in the form of pellets of rubber.

5. A solar collector as defined in claim 2 wherein said housing is constructed of wood.

6. A solar collector as defined in claim 2 further comprising means located adjacent the exterior surface of said base for providing an insulating barrier thereagainst.

7. A solar collector as defined in claim 6 wherein said cover is made of plexiglass.

8. A solar collector as defined in claim 7 further comprising means interposed between said base and said cover for supporting said cover and said first and second openings being formed in one of said sides of said housing.

9. A solar collector as defined in claim 8 further comprising a gasket interposed between said housing and said cover.

10. A solar collector as defined in claim 9 wherein said heat absorbing material is in the form of pellets of coal and rubber.

* * * * *